(12) United States Patent
Lutzka et al.

(10) Patent No.: US 8,002,356 B2
(45) Date of Patent: Aug. 23, 2011

(54) PIVOTING HEADREST ASSEMBLY WITH CAM RELEASE

(75) Inventors: Tavis Lutzka, Davisberg, MI (US); Stephen Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 357 days.

(21) Appl. No.: 12/269,950

(22) Filed: Nov. 13, 2008

(65) Prior Publication Data
US 2010/0117432 A1    May 13, 2010

(51) Int. Cl.
*B60N 2/48* (2006.01)
(52) U.S. Cl. .......................................... 297/408; 297/403
(58) Field of Classification Search ............. 297/216.12, 297/403, 408
See application file for complete search history.

(56) References Cited

U.S. PATENT DOCUMENTS

| | | | |
|---|---|---|---|
| 4,596,403 A * | 6/1986 | Dieckmann et al. | 280/751 |
| 4,796,953 A | 1/1989 | Pereira | |
| 5,484,189 A | 1/1996 | Patterson | |
| 5,590,933 A | 1/1997 | Andersson et al. | |
| 5,681,079 A | 10/1997 | Robinson | |
| 5,927,804 A | 7/1999 | Cuevas | |
| 6,024,405 A | 2/2000 | MacAndrew et al. | |
| 6,045,181 A | 4/2000 | Ikeda et al. | |
| 6,074,011 A | 6/2000 | Ptak et al. | |
| 6,192,565 B1 | 2/2001 | Tame | |
| 6,270,161 B1 | 8/2001 | De Filippo | |
| 6,612,653 B2 | 9/2003 | Takata | |
| 6,702,385 B2 | 3/2004 | Holdampf et al. | |
| 6,726,283 B2 | 4/2004 | Schambre et al. | |
| 6,880,890 B1 | 4/2005 | DeBrabant | |
| 6,935,696 B2 | 8/2005 | Gauthier et al. | |
| 7,048,334 B2 | 5/2006 | Pal et al. | |
| 7,066,545 B2 | 6/2006 | Terada et al. | |
| 7,118,174 B2 | 10/2006 | Lee | |
| 7,140,687 B2 | 11/2006 | Hoekstra et al. | |
| 7,226,124 B2 | 6/2007 | Mori et al. | |
| 7,234,778 B1 * | 6/2007 | Toba | 297/403 |
| 7,322,646 B2 | 1/2008 | Jammalamadaka et al. | |
| 7,325,877 B2 | 2/2008 | Brockman et al. | |
| 7,341,312 B2 | 3/2008 | Gauthier et al. | |
| 7,350,859 B2 | 4/2008 | Klukowski | |
| 7,367,626 B2 | 5/2008 | Lawall et al. | |

(Continued)

FOREIGN PATENT DOCUMENTS
EP    2039562 A1    3/2009
(Continued)

*Primary Examiner* — Peter R. Brown
(74) *Attorney, Agent, or Firm* — Gifford, Krass, Sprinkle, Anderson & Citkowski, P.C.

(57) ABSTRACT

A pivoting headrest assembly including a bracket supported upon a seatback frame. A headrest support secures a bun and is pivotally secured to the bracket in a forward biased direction. A rotating sector is supported upon the bracket and is pivotally slaved to the headrest support. A cam is pivotally supported upon the bracket and biased in a first direction to abut the sector in an upright design position established by the headrest support. A contact portion extends from a location of the cam offset from its pivotal connection to the bracket. A lever is independently rotated and coaxially supported relative to the rotating sector in a first biased direction. The lever is actuated against the bias to engage the contact portion, with continued actuation causing the cam to pivotally disengage from the rotating sector, whereupon the headrest support and bun pivotally actuates to a forward dump position.

21 Claims, 9 Drawing Sheets

U.S. PATENT DOCUMENTS

| | | |
|---|---|---|
| 7,422,280 B2 * | 9/2008 | Brockman ............... 297/216.12 |
| 7,429,082 B2 | 9/2008 | Kraft et al. |
| 7,543,891 B2 * | 6/2009 | Chung, II ....................... 297/408 |
| 7,681,955 B2 * | 3/2010 | Seo ................................ 297/408 |
| 2001/0002764 A1 | 6/2001 | Fischer et al. |
| 2005/0225146 A1 | 10/2005 | Sutter et al. |
| 2006/0012233 A1 | 1/2006 | Karlberg |
| 2006/0250017 A1 | 11/2006 | Otto et al. |
| 2007/0236070 A1 | 10/2007 | Brockman |
| 2008/0001456 A1 | 1/2008 | Muller et al. |
| 2008/0036250 A1 | 2/2008 | Kim |
| 2009/0152924 A1 * | 6/2009 | Kim et al. ..................... 297/408 |
| 2009/0167066 A1 | 7/2009 | Mori et al. |
| 2009/0261635 A1 | 10/2009 | Yamaguchi et al. |
| 2010/0052379 A1 | 3/2010 | Otsuka |

FOREIGN PATENT DOCUMENTS

| | | |
|---|---|---|
| EP | 2106963 A1 | 10/2009 |
| EP | 2116416 A1 | 11/2009 |
| GB | 2432784 A | 6/2007 |
| JP | 2009202785 A | 9/2009 |

* cited by examiner

PIVOTING HEADREST ASSEMBLY WITH CAM RELEASE

FIELD OF THE INVENTION

The present invention relates generally to pivoting or foldable headrest assemblies. More specifically, the present invention discloses a pivoting headrest assembly incorporating a cable operated release lever which, upon pivotally engaging a cam, displaces the cam out of engagement with a spring loaded release sector. A pivot rod and pair of spaced apart and bun supporting headrest supports are slaved to the release sector and are pivoted from an upright design to a forward rotated position, such as to allow a rear row seat to be dumped without the headrest colliding with a forward positioned seat.

BACKGROUND OF THE INVENTION

The prior art is documented with numerous examples of folding headrest restraint mechanisms. One known purpose of such mechanisms is to reduce an overall height profile of a rear foldable seat, in particular so that the seat can be forwardly dumped (and selectively forwardly rotated) in a fashion so that it does not interfere with a forwardly located seat.

Examples of such headrest folding mechanisms include that disclosed in Robinson U.S. Pat. No. 5,681,079, and which includes a headrest latch mechanism operable in a locked mode for releasably latching a headrest in an upright/use position, as well as in a released mode for permitting movement of the headrest toward a forward dump position. A separate latch release mechanism is employed to permit the headrest latch mechanism to be selectively shifted from the locked mode into the released mode. In a preferred application, the latch release mechanism interconnects the headrest latch mechanism to a seatback latch mechanism such that the headrest latch mechanism is released upon the seatback latch mechanism being shifted to an unlatched mode, and due to actuation of the latch release mechanism.

Another example of an articulating head restraint mechanism is set forth in Gautheir U.S. Pat. No. 6,935,696, and which discloses an armature with a cam. The cam includes a lock acumination (point tapering) and a stop acumination. The armature fits within a structure composed of a bracket and a slave bracket. A slide, attached to a cable, rides within a slot on the bracket. When the slide is in a locked position, the tapered acumination of the cam presses against the slide, thereby restraining its movement. Upon sufficient force being applied to the cable, the slide moves within the slot to an unlocked position, at which point a torsion spring wrapped around the armature causes the armature to rotate to a forward stowed position.

Other noteworthy examples of foldable headrest restraints include those set forth in U.S. Pat. No. 7,395,877 (Brockman), 2005/0225146 Sutler, Jr. and 2007/0236070 (Brockmen).

SUMMARY OF THE INVENTION

The present invention discloses a pivoting headrest assembly including a bracket supported upon a seatback frame. A headrest support secures a bun and is pivotally secured to the bracket in a forward biased direction. A rotating sector is supported upon the bracket and is pivotally slaved to the headrest support.

A cam is pivotally supported upon the bracket and biased in a first direction to abut the sector in an upright design position established by the headrest support. A contact portion extends from a location of the cam offset from its pivotal connection to the bracket.

A lever is independently rotated and coaxially supported relative to the rotating sector in a first biased direction. The lever is actuated against the bias to engage the contact portion, with continued actuation causing the cam to pivotally disengage from the rotating sector, whereupon the headrest support and bun pivotally actuates to a forward dump position.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
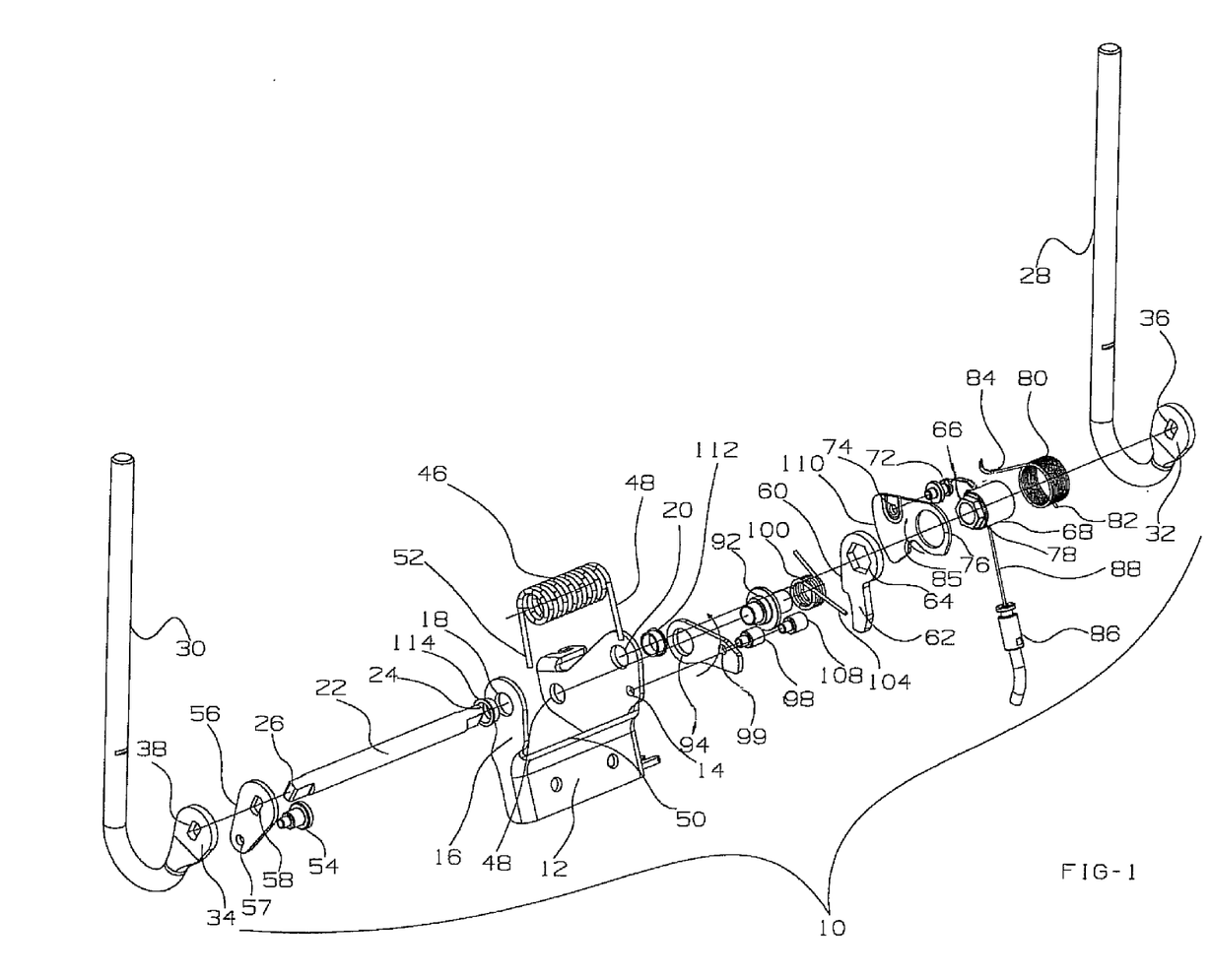
FIG. 1 is an exploded view of the pivoting headrest assembly according to the present invention.

Referring now to FIG. 1 an exploded view is generally referenced at 10 of a pivoting headrest assembly according to the present invention. As will be further described in reference to the various succeeding illustrations, the headrest assembly 10 is an improvement over prior art headrest designs in that it provides for improved triggering and releasing of a headrest supported bun, see at 2 in each of FIGS. 3, 4, 7 and 9.

A support bracket 12 is secured to an upper widthwise extending portion 4 of an existing frame 6 embedded within a cushion 8 of a seatback, upon which the headrest assembly is supported. The bracket 12 is constructed of a durable steel material and is again secured to the upper widthwise extending portion 4 of the seatback frame 6. The bracket 12 includes a pair of upward extending, planar shaped and spaced apart mounting projections, at 14 and 16.

Apertures 18 and 20 (again FIG. 1) are defined in aligning fashion in the projections 14 and 16, and through which extends a rotating pivot rod 22. The rod 22 is constructed of a durable steel material and includes a first keyed end 24 and a second keyed end 26, each of which projects beyond an exterior surface of an associated mounting projection 14 and 16.

Figure 8:
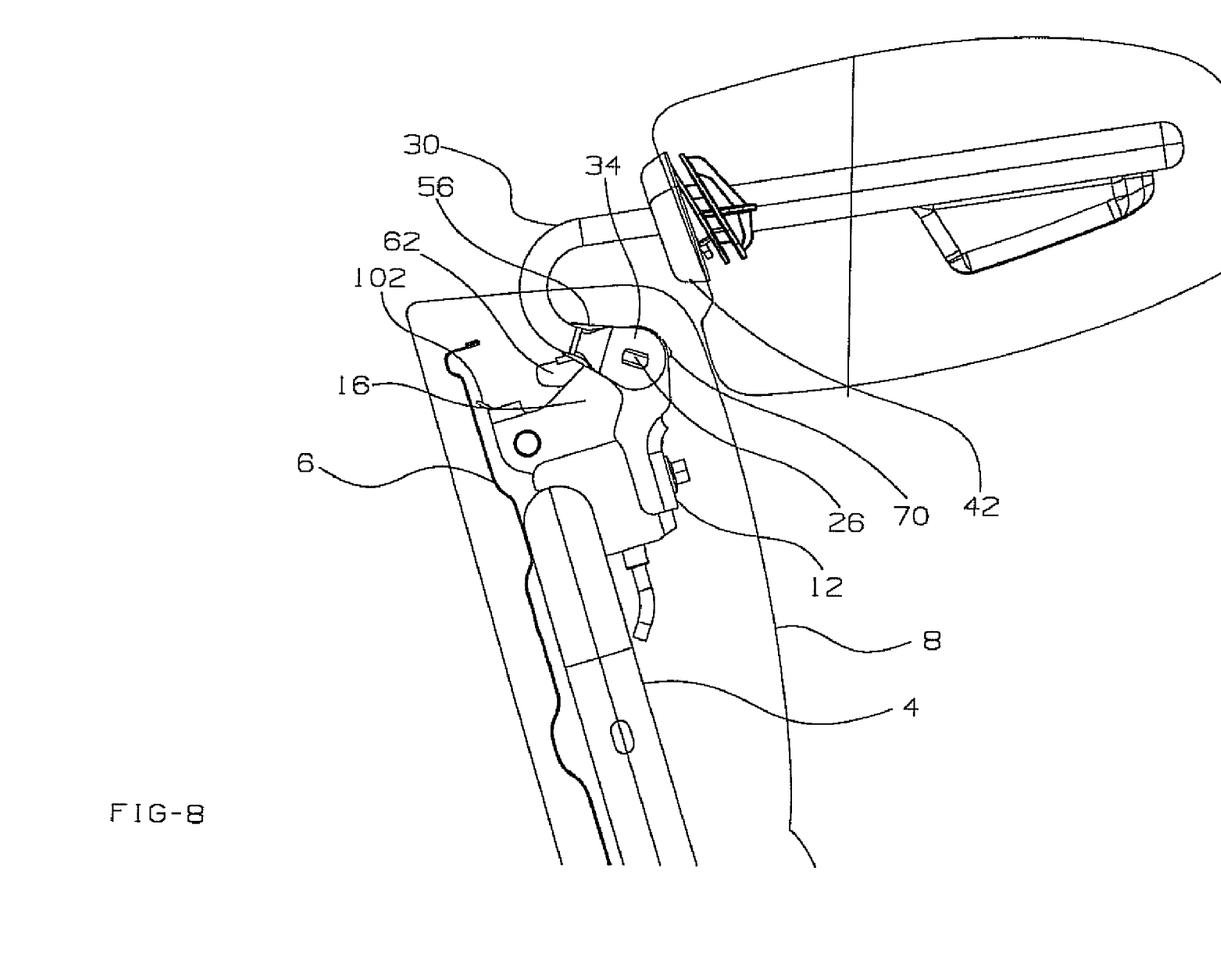
FIG. 8 is a side plan view of the headrest components features in FIG. 6 and again illustrating the forward folding of the headrest by its main spring.
Figure 9:
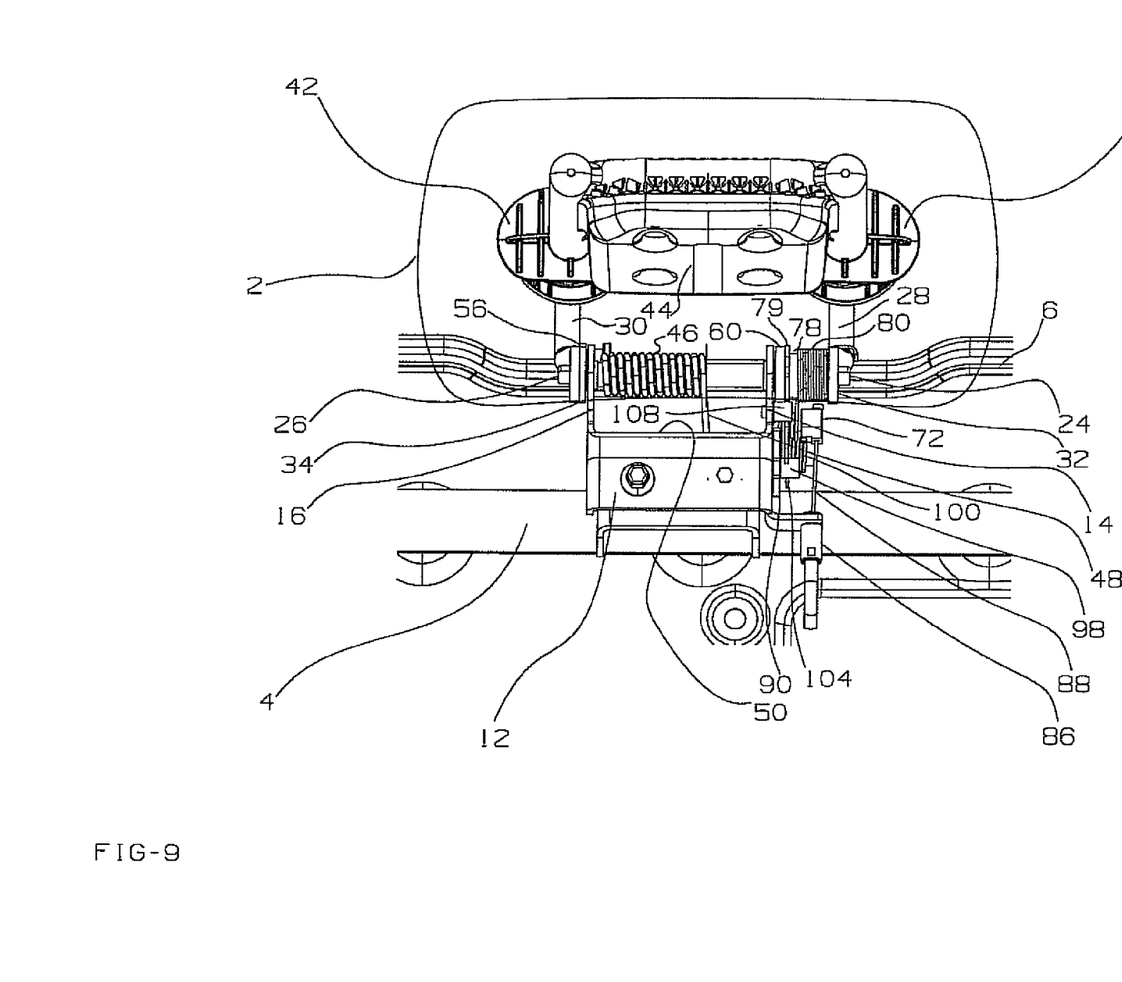
FIG. 9 is an illustration similar to that shown in FIG. 2 of the pivoting headrest assembly in a forward rotated dump position.

A pair of elongated and spaced apart headrest supports are referenced at 28 and 30, each exhibiting an arcuate extending end, at 32 and 34 respectively, and so that each elongated support exhibits a substantially "J" shape. The configuration of the elongated supports 28 and 30 is such that, upon displacement relative to the seatback cushion, the associated headrest bun 2 is displaced in a combined forward and downward fashion so that the bun surface substantially clears the seatback cushion 8 as best shown in each of FIGS. 7 and 8. Each of the arcuate extending ends 32 and 34 further includes a keyed aperture location, see at 36 and 38 (again as shown in FIG. 1), and through which is seated the opposite keyed ends 24 and 26 of the pivot rod 22.

Figure 2:
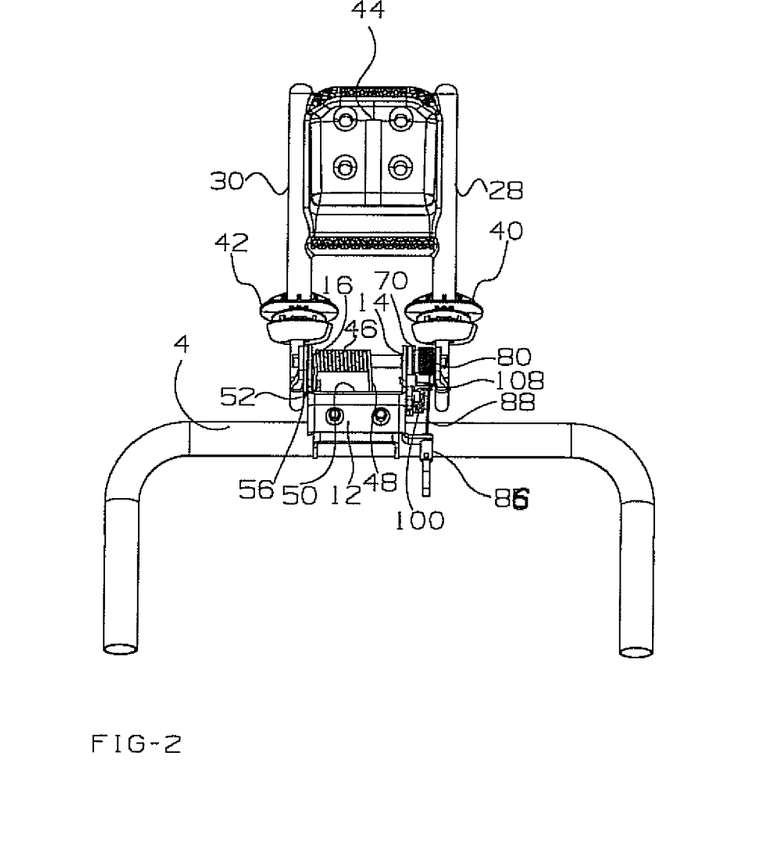
FIG. 2 is a frontal assembled view of the pivoting headrest assembly in upright design position and further showing the features of the seatback frame to which the headrest bracket mount is secured.
Figure 3:
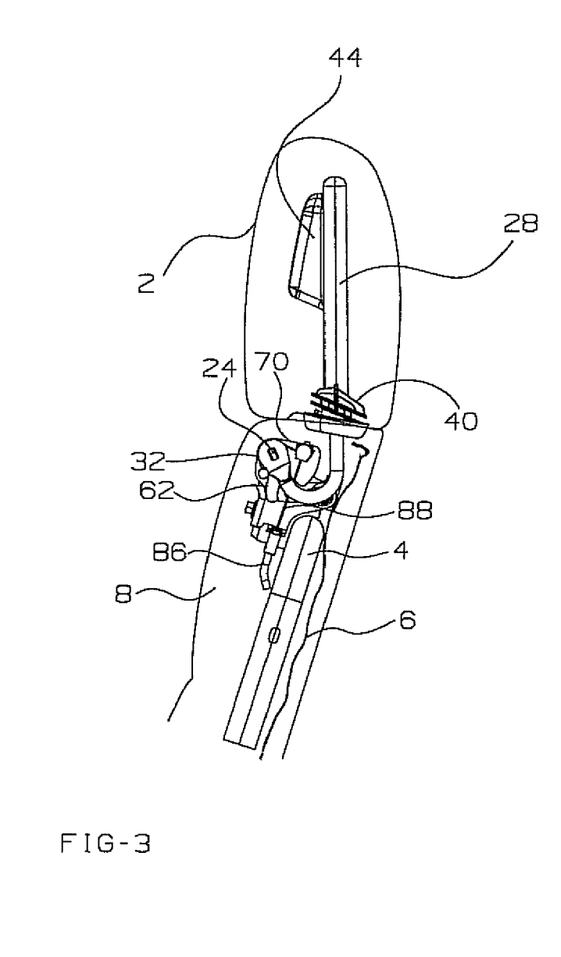
FIG. 3 is an operational side view of the headrest assembly shown in FIG. 2.
Figure 4:
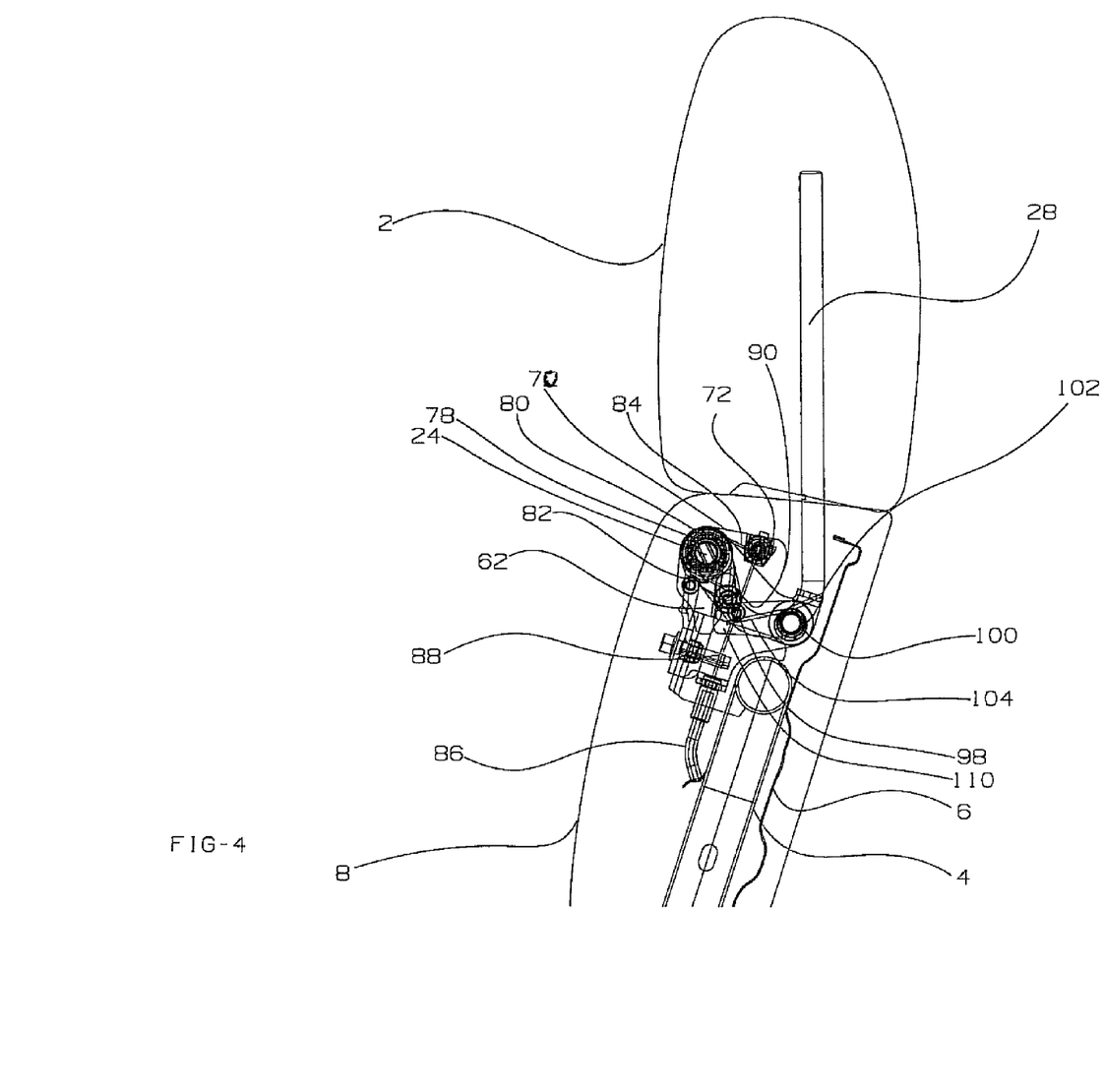
FIG. 4 is an enlargement of FIG. 3 and better illustrating the manner in which the release cable engages the cable lever and associated rivet.

The headrest supports 28 and 30 each include bracket portions, see at 40 and 42, which are positioned approximate lower mounting locations of the headrest bun 2. The supports 28 and 38 extend in a height wise fashion within interiors of the bracket portions 40 and 42, these terminating in an upper and crosswise extending inner structural support 44, see as shown in FIGS. 2-4, about which the bun 2 is mounted. In this fashion, the headrest bun 2 is pivotally secured in slaved fashion to the opposite keyed ends 24 and 26 of the pivot rod.

A main coil spring 46 is supported upon the pivot rod 22 at a location between the bracket mounting projections 18 and 20. A first extending end 48 of the main coil spring 46 abuts against an inside surface 50 of the bracket 12. A second extending end 52 of the main coil spring 46 abuts, in an opposite rotationally biased direction, a contact rivet 54 projecting from a free pivot lever 56. The contact rivet 54 is located a spaced distance from a rotational coaxial support location (see mounting aperture 57 in FIG. 1), generally referenced by a keyed location 58 of the free pivot lever 56 and such that the free pivot lever 56 is coaxially supported in sandwiched fashion between the headrest support arcuately configured mounting projection 34 and the mounting projection 16.

A rotating sector 60 is supported upon an exterior face of the bracket mounting portion 14 bracket. The rotating sector 60 exhibits a (downwardly) projecting finger 62 and a keyed aperture profile, see at 64, which receives a likewise keyed end profile 66 associated with a support bushing 68.

A lever 70 is independently rotated and coaxially supported relative to the rotating sector 60 in a first biased direction. A rivet 72 is secured to the lever (see at mounting aperture 74) at a location offset from the lever axis of rotation, referenced by circular aperture 76 through which is seated a circular shaped perimeter 78 of the projecting portion of the support bushing 68.

A torsion spring 80 is mounted upon a main circular shaped body of the support bushing 68 and includes a first end 82 biased against the bracket 12. A second biased end 84 of the torsion spring 80 contacts the lever rivet 72 and biases the same in a direction referenced by arrow 85 in FIG. 1. In this fashion, the lever 70 is independently rotatably relative to the sector 60, while they both are coaxially mounted approximate the keyed end portion 24 of the pivot rod 22 and in sandwiching fashion between the mounting portion 14 and the arcuate shaped end 32 of the selected headrest support 28.

Figure 5:
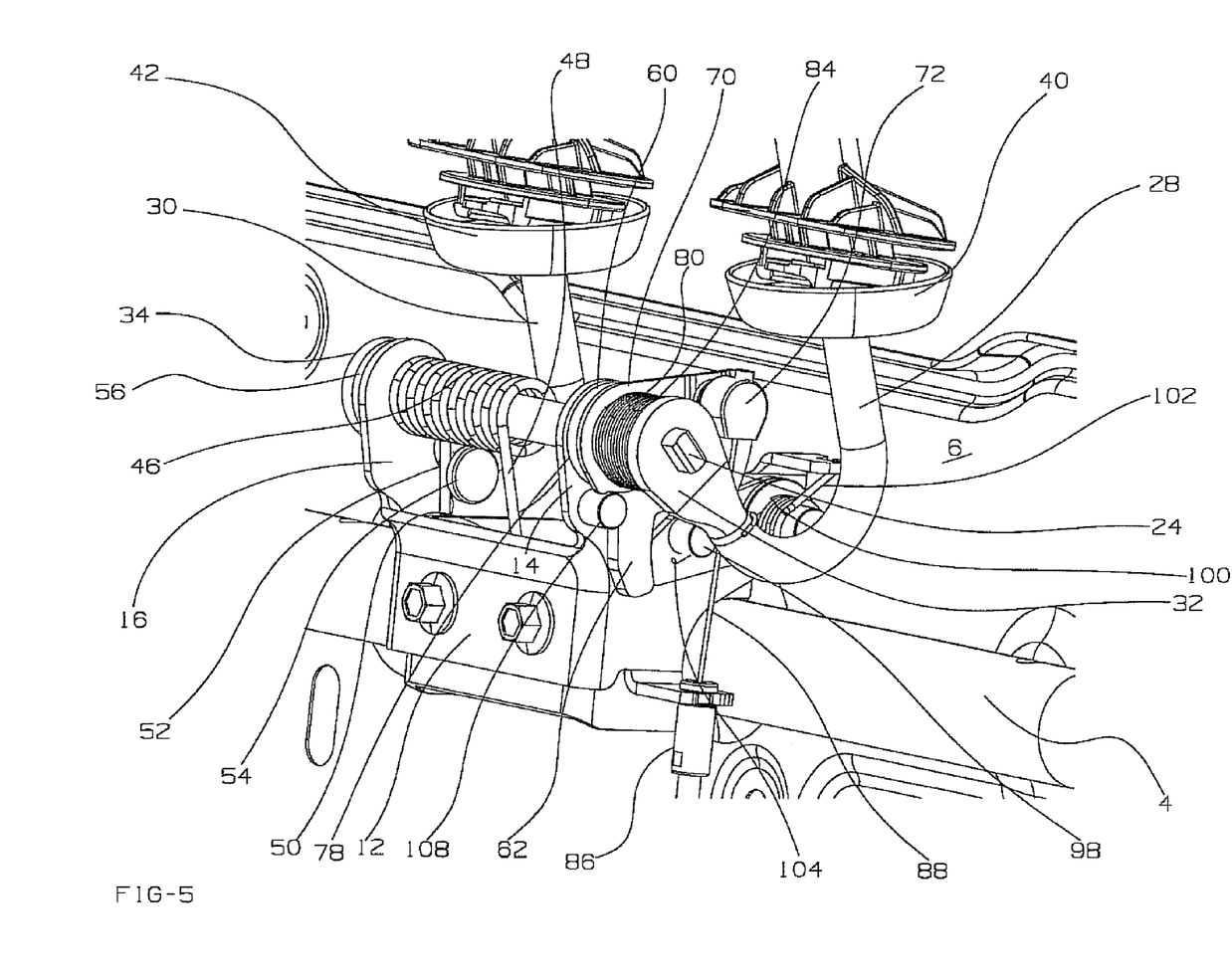
FIG. 5 is an enlarged perspective of the headrest assembly shown in FIG. 2 and better illustrating the arrangement of cable operated lever, cam, and sector for release triggering the headrest supports via the interconnecting pivot rod.
Figure 6:
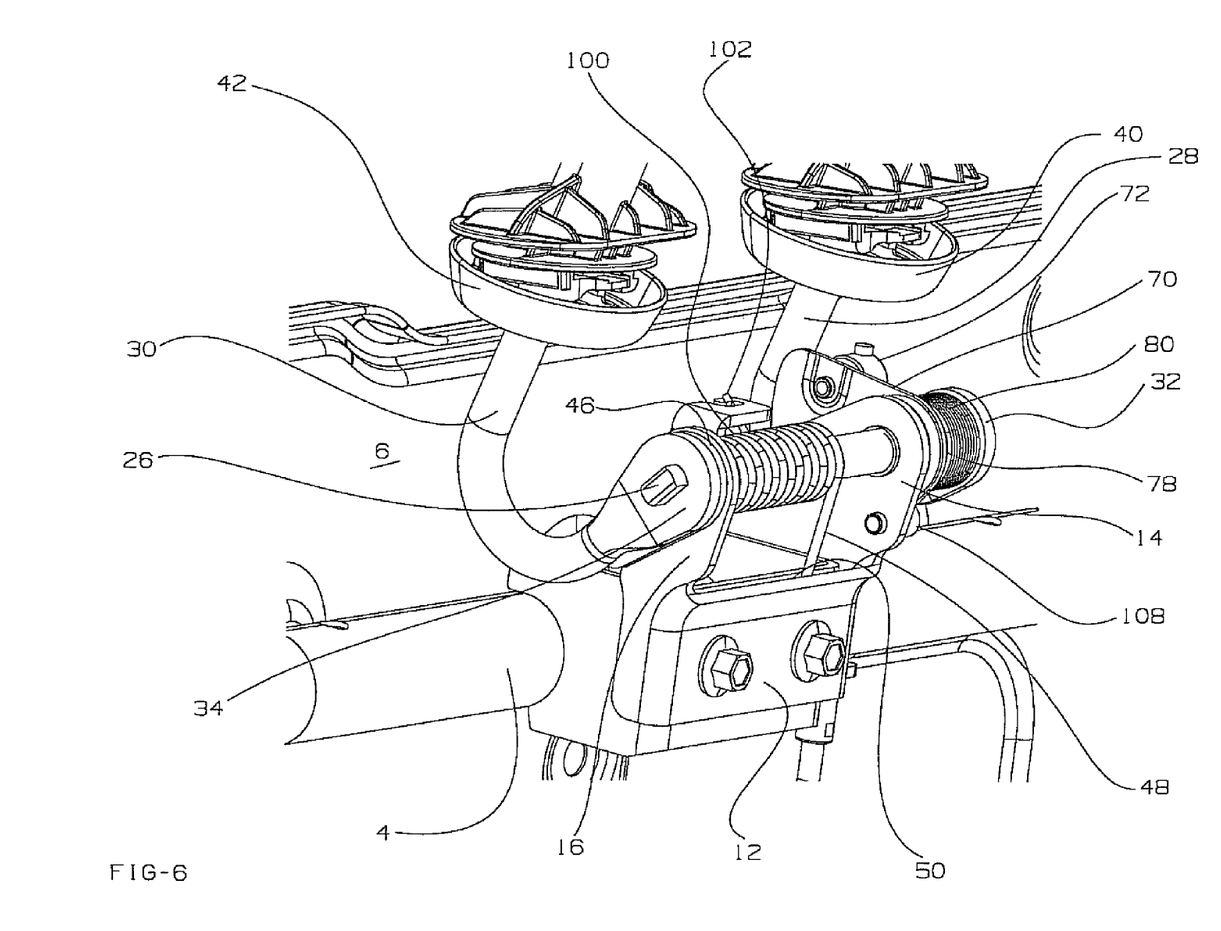
FIG. 6 is a rotated perspective of the headrest assembly of FIG. 5 and featuring the free pivot side pivotally secured to the bracket mount via the crosswise extending pivot rod.
Figure 7:
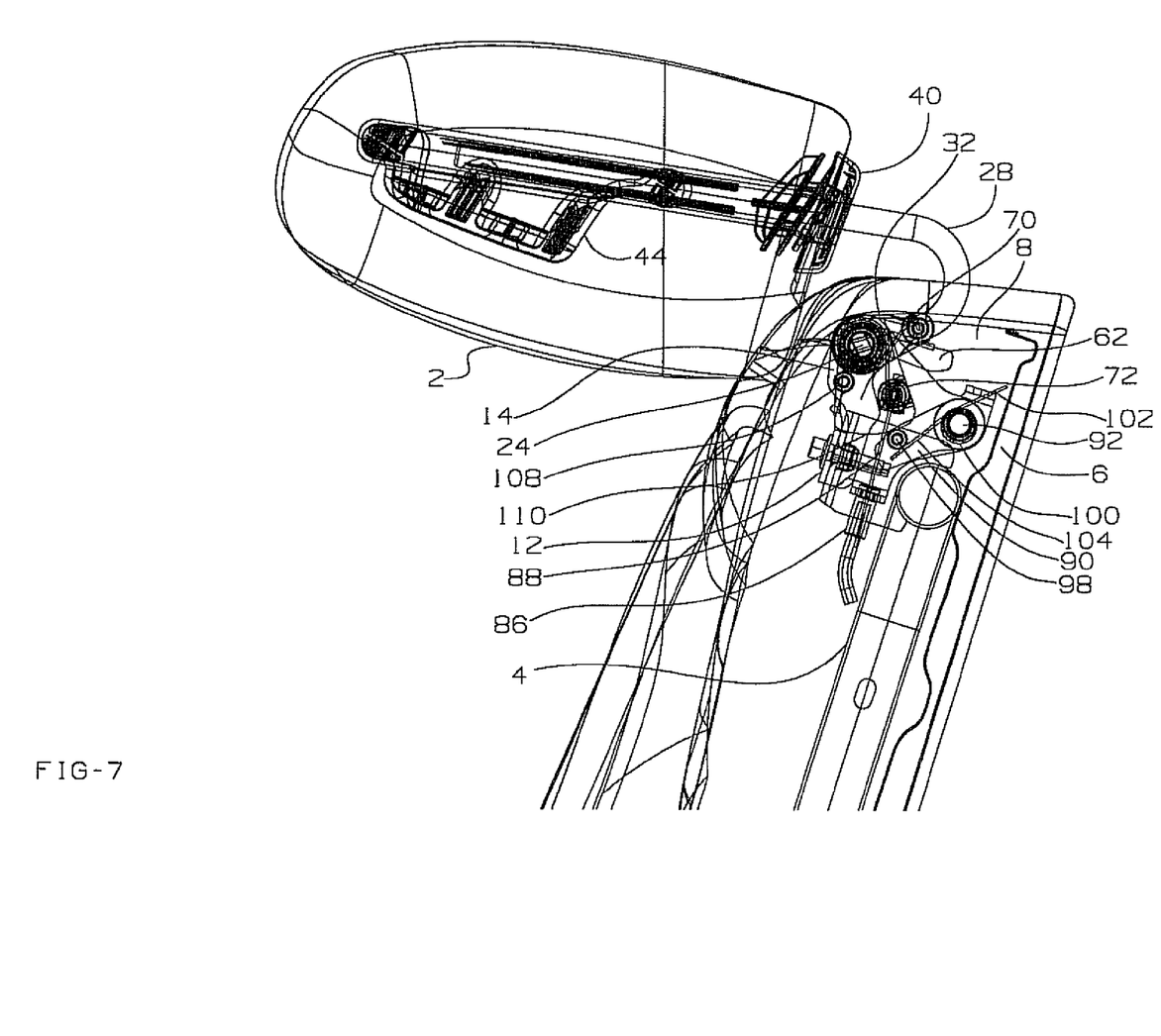
FIG. 7 is a side plan view of the headrest components featured in FIG. 5 and further showing the triggering of the cam and release of the sector, resulting in forward folding of the headrest by its main spring.

A cable exhibits a fixed outer sheath 86 which is secured to a fixed location of the bracket mount 12 (see as best shown in FIG. 5) An inner translating portion 88 of the cable extends from the outer sheath 86 and is connected to the rivet 72 associated with the lever 70.

A cam 90 is pivotally supported upon the exterior face of the mounting portion 14 of the bracket 12, via a rivet support 92 extending through a circular aperture 94 defined in the cam 90, and for pivotally mounting the cam 90 to a spaced apart aperture location 96 along a side surface of the bracket 12 corresponding to the mounting portion 14. The cam 90 is biased in a first direction (see arrow 91 in FIG. 1) to abut the projecting finger 62 associated with the rotating sector 60, in an upright design position established by the headrest supports 28 and 30, this resulting from a contact rivet 98 secured to and extending from a location 99 (again FIG. 1) of the cam 90 offset from its pivotal connection to the bracket 12. A cam spring 100 is supported on the pivoting rivet support 92, a first extending end 102 of the cam spring 100 abutting the bracket 12, with a second extending end 104 of the cam spring 100 abuts the cam contact portion (rivet) 98.

Displacement of the inner translatable cable 88 is initiated in a downward direction towards the fixedly secured sheath 86 and which is understood to be caused such as upon actuation of a remotely located lever or trigger (not shown) in turn occurring upon the seatback folding relative to a seat bottom (also not shown). FIGS. 10a-10d detail the protocol for release triggering the headrest support, this including the actuation of the cable operated release lever 70 in a progressing clockwise direction 106 (see FIGS. 10a and 10b) and until abutting against a further rivet 108 mounted at a generally forward end location of the bracket mounting portion 14.

Figure 10:
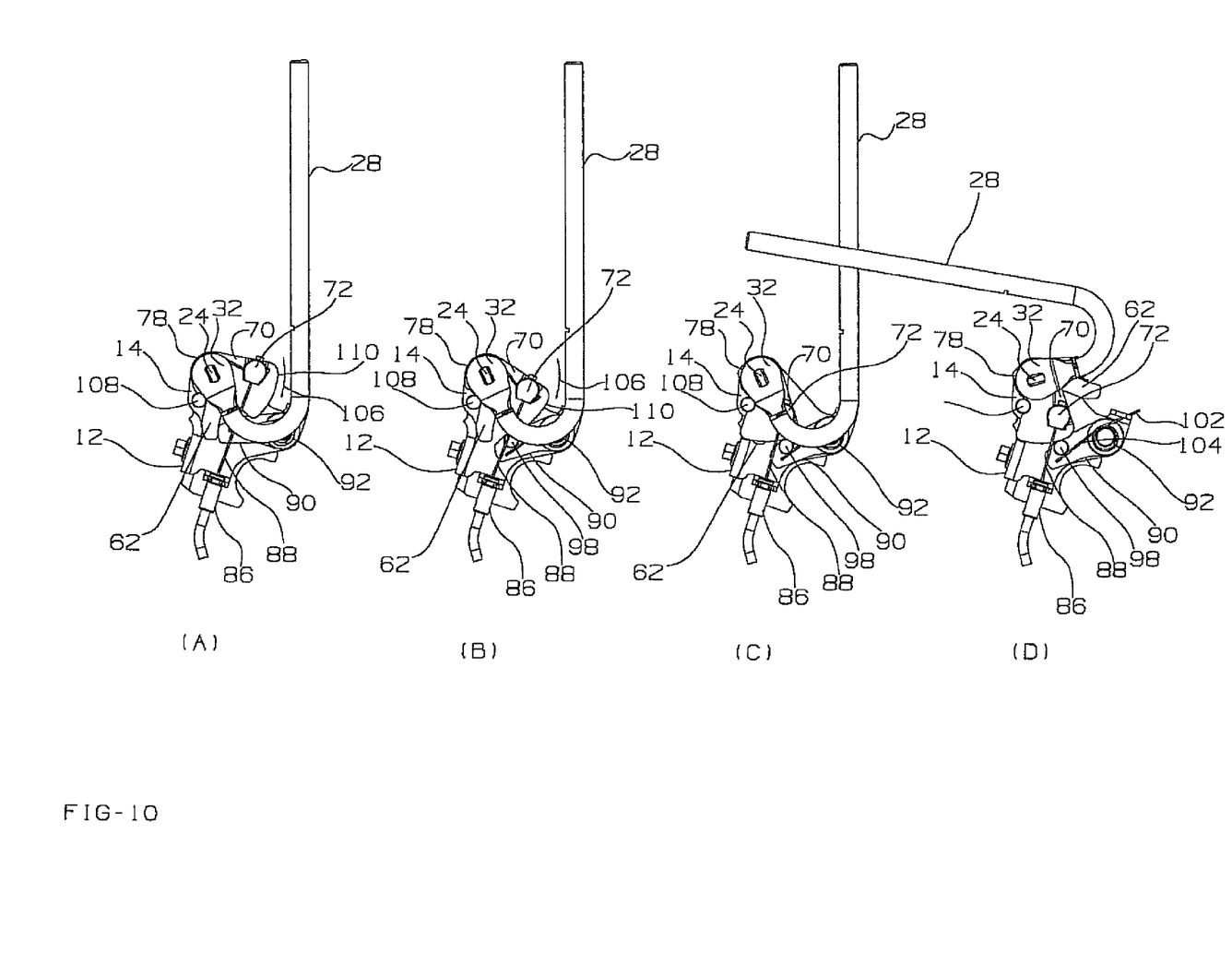
FIGS. 10a-10d illustrate a succession of side illustrations detailing the actuation of the cable operated release lever, with FIG. 10d replicating the side view illustration of FIG. 7, and by which pivotally engaging the cam it out of engagement with a spring loaded release sector, such resulting in the pivot rod and pair of spaced apart and bun supporting headrest supports which are slaved to the release sector to be then pivoted from the upright design to the forward rotated position.

A bottom arcuate surface 110 of the release lever 70 engages the contact rivet 98 of the pivotally secured cam 90 (at the initially displaced location of FIG. 10b). Upon continued actuation (to FIG. 10c), the release lever arcuate surface 110 causes the cam 90 to pivotally disengage (in a direction opposite to the bias direction 91 referenced in FIG. 1) from the downwardly projecting finger 62 of the rotating sector 60, whereupon uninhibited rotation of the sector 60 (see finger 62 in FIG. 10d) results in the headrest supports 28 and 30 and bun 2 pivotally actuating to a forward dump position (as further referenced by support 28' in both the side view of FIG. 10d and the corresponding enlarged illustration of FIG. 7) relative the seatback.

Biased actuation of the headrest supports 28 and 30 is again influenced by the rotating influence of the extending end 52 of the main coil spring 46 which contacts the contact rivet 54 secured to the free pivot lever 56 and which freely dumps the slaved headrest supports 28 and 30 (via the interconnecting pivot rod 22) and once the sector 60 is allowed to freely rotate by the disengagement of the cam 90. Additional features include a pair of load bearing bushings, see at 112 and 114 in FIG. 1, secured to the support locations (apertures 18 and 20) of the bracket side mounting portions 14 and 16, receiving there through opposite extending (keyed) ends 24 and 26 of the pivot rod 22.

Having described our invention, other and additional preferred embodiments will become apparent to those skilled in the art to which it pertains, and without deviating from the scope of the appended claims.

We claim:

1. A pivoting headrest assembly, comprising:
   a bracket supported upon a seatback frame;
   a headrest support pivotally secured to said bracket and biased in a forward rotating dump direction;
   a headrest bun secured to said headrest support;
   a rotating sector supported upon said bracket and pivotally slaved to said headrest support;
   a cam pivotally supported upon said bracket and biased in a first direction to abut said sector in an upright design position established by said headrest support, a contact portion extending from a location of said cam offset from its pivotal connection to said bracket; and
   a lever independently rotated and coaxially supported relative to said rotating sector in a first biased direction, said lever being actuated against said bias to engage said contact portion, continued actuation of said lever causing said cam to pivotally disengage from said rotating sector, whereupon said headrest support and bun pivotally actuates to a forward dump position.

2. The headrest assembly as described in claim 1, said headrest support further comprising a pair of elongated and spaced apart supports, a pivot rod extending widthwise through aligning support locations of said bracket, to which ends of said supports are mounted.

3. The headrest assembly as described in claim 2, said headrest supports each further comprising an arcuate shaped end secured to said pivot rod, actuation of said supports displacing said headrest bun in a combined forward spaced and downwardly rotating direction relative to a cushioning material surrounding the seatback frame.

4. The headrest assembly as described in claim 3, said bracket further comprising a pair of upward extending and spaced apart mounting projections through which said pivot rod extends, said rotating sector and said lever being coaxially mounted in sandwiched fashion between a selected mounting projection and an arcuate shaped end of a selected headrest support.

5. The headrest assembly as described in claim 4, further comprising a free pivot lever coaxially supported in fixed and sandwiched fashion between the other selected mounting projection and an arcuate shaped end of the other selected headrest support, a contact rivet mounting to an end of said free pivot lever a distance from said coaxial support location and extending inwardly past said mounting projection.

6. The headrest assembly as described in claim 5, further comprising a main coil spring supported upon said pivot rod at a location between said bracket mounting projections, a first extending end of said main coil spring abutting against an inside surface of said bracket, a second extending end of said main coil spring abutting, in an opposite rotational direction, said contact rivet at a location spaced from its rotational coaxial support such that, upon pivotal disengagement of said cam from said slaved rotating sector, said second end leg influences said slaved rotating headrest supports towards said dump position.

7. The headrest assembly as described in claim 2, further comprising a pair of load bearing bushings secured to said support locations of said bracket and receiving there through opposite extending ends of said pivot rod.

8. The headrest assembly as described in claim 1, further comprising a cable connecting to said lever at a location offset from its axis of rotation, displacement of said cable causing rotation of said lever in a cam actuating direction.

9. The headrest assembly as described in claim 8, further comprising a rivet secured to said lever and to which said cable is engaged, a torsion spring including a first end biased against said bracket, a second biased end of said torsion spring contacting said rivet.

10. The headrest assembly as described in claim 9, further comprising a support bushing upon which is supported said torsion spring, said lever exhibiting a circular aperture through which a circular shaped perimeter of a projecting portion of said support bushing is seated, said rotating sector including a keyed aperture profile which receives a likewise keyed end profile associated with said support bushing.

11. The headrest assembly as described in claim 1, further comprising a rivet support securing to a surface of said bracket and to which said cam is pivotally mounted.

12. The headrest assembly as described in claim 1, further comprising a pivot rivet extending through an aperture in said cam for pivotally mounting said cam to said bracket, a cam spring supported on said pivot rivet and including a first extending end of said cam spring abutting said bracket, a second extending end of said cam spring abutting said cam contact portion.

13. A pivoting headrest assembly supported upon a vehicle seatback, comprising:
    a bracket secured to an upper seatback frame and including a pair of upward extending and spaced apart mounting projections through which extends a rotating pivot rod;
    a pair of elongated and spaced apart headrest supports pivotally secured in slaved fashion to opposite ends of said pivot rod and biased in a forward rotating dump direction;
    a headrest bun secured to said headrest supports;
    a rotating sector supported upon said bracket and pivotally slaved to a selected headrest support;
    a cam pivotally supported upon said bracket and biased in a first direction to abut a projecting finger associated with said sector in an upright design position established by said headrest supports, a contact rivet extending from a location of said cam offset from its pivotal connection to said bracket; and
    a lever independently rotated and coaxially supported relative to said rotating sector in a first biased direction, a cable connected to said lever at a location offset from its axis of rotation, displacement of said cable causing said lever to actuate against said bias to engage said contact rivet, continued actuation of said lever causing said cam to pivotally disengage from said rotating sector, whereupon uninhibited rotation of said sector results in said headrest supports and bun pivotally actuating to a forward dump position relative the seatback.

14. The headrest assembly as described in claim 13, said headrest supports each further comprising an arcuate shaped end secured to said pivot rod, actuation of said supports displacing said headrest bun in a combined forward spaced and downwardly rotating direction relative to a cushioning material surrounding the seatback frame.

15. The headrest assembly as described in claim 13, further comprising a pair of load bearing bushings secured to said support locations of said bracket and receiving there through opposite extending ends of said pivot rod.

16. The headrest assembly as described in claim 13, further comprising a rivet support securing to a surface of said bracket and to which said cam is pivotally mounted.

17. The headrest assembly as described in claim 13, further comprising a free pivot lever coaxially supported in fixed and sandwiched fashion between the other selected mounting projection and an arcuate shaped end of the other selected headrest support, a contact rivet mounting to an end of said free pivot lever a distance from said coaxial support location and extending inwardly past said mounting projection.

18. The headrest assembly as described in claim 17, further comprising a main coil spring supported upon said pivot rod at a location between said bracket mounting projections, a first extending end of said main coil spring abutting against an inside surface of said bracket, a second extending end of said main coil spring abutting, in an opposite rotational direction, said contact rivet at a location spaced from its rotational coaxial support such that, upon pivotal disengagement of said cam from said slaved rotating sector, said second end leg influences said slaved rotating headrest supports towards said dump position.

19. The headrest assembly as described in claim 13, further comprising a rivet secured to said lever and to which said cable is engaged, a torsion spring including a first end biased against said bracket, a second biased end of said torsion spring contacting said lever rivet.

20. The headrest assembly as described in claim 19, further comprising a support bushing upon which is supported said torsion spring, said lever exhibiting a circular aperture through which a circular shaped perimeter of a projecting portion of said support bushing is seated, said rotating sector including a keyed aperture profile which receives a likewise keyed end profile associated with said support bushing.

21. The headrest assembly as described in claim 13, further comprising a pivot rivet extending through an aperture in said cam for pivotally mounting said cam to said bracket, a cam spring supported on said pivot rivet and including a first extending end of said cam spring abutting said bracket, a second extending end of said cam spring abutting said cam contact portion.

* * * * *